(12) United States Patent
Fugate et al.

(10) Patent No.: US 9,804,813 B2
(45) Date of Patent: Oct. 31, 2017

(54) AUGMENTED REALITY CROSS-DOMAIN SOLUTION FOR PHYSICALLY DISCONNECTED SECURITY DOMAINS

(71) Applicants: Sunny James Fugate, San Diego, CA (US); Chun-Che Peng, San Diego, CA (US); Daniel C. Grady, San Diego, CA (US)

(72) Inventors: Sunny James Fugate, San Diego, CA (US); Chun-Che Peng, San Diego, CA (US); Daniel C. Grady, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 14/503,010

(22) Filed: Nov. 26, 2014

(65) Prior Publication Data

US 2016/0147492 A1 May 26, 2016

(51) Int. Cl.
| | |
|---|---|
| *G06T 19/00* | (2011.01) |
| *G06F 3/14* | (2006.01) |
| *G09G 5/00* | (2006.01) |
| *G06F 3/147* | (2006.01) |
| *G09G 3/00* | (2006.01) |

(Continued)

(52) U.S. Cl.
CPC ......... *G06F 3/1423* (2013.01); *G02B 27/017* (2013.01); *G06F 3/147* (2013.01); *G06F 21/34* (2013.01); *G06F 21/42* (2013.01); *G06F 21/602* (2013.01); *G06T 19/006* (2013.01); *G09G 3/001* (2013.01); *G09G 3/002* (2013.01); *G09G 3/003* (2013.01); *G09G 5/003* (2013.01); *A63F 2300/8082* (2013.01); *G02B 2027/0138* (2013.01); *G02B 2027/0178* (2013.01); *G09G 2358/00* (2013.01)

(58) Field of Classification Search
None
See application file for complete search history.

(56) References Cited

U.S. PATENT DOCUMENTS

| | | |
|---|---|---|
| 7,853,296 B2 | 12/2010 | Yu et al. |
| 8,400,548 B2 | 3/2013 | Bilbrey et al. |

(Continued)

FOREIGN PATENT DOCUMENTS

| | | | |
|---|---|---|---|
| WO | WO2011152634 A2 | 8/2011 | |
| WO | WO 2014107681 A1 * | 7/2014 | ............. G06Q 30/02 |

*Primary Examiner* — Xiao Wu
*Assistant Examiner* — Steven Elbinger
(74) *Attorney, Agent, or Firm* — SPAWAR Systems Center Pacific; Kyle Eppele; J. Eric Anderson

(57) ABSTRACT

A method comprising the steps of: displaying primary data having a first sensitivity level on a first display screen that is operatively coupled to a first computer; capturing an image of the first display screen with an image capture device that is operatively coupled to a second computer that is communicatively isolated from the first computer such that no data is shared between the first and second computers; executing with the second computer a display recognition and characterization algorithm to recognize the primary data based only on the captured image of the first display screen; and augmenting the primary data by displaying secondary data on a second display, wherein the secondary data is related to, and has a higher sensitivity level than, the primary data.

14 Claims, 6 Drawing Sheets

(51) Int. Cl.
   *G06F 21/34* (2013.01)
   *G06F 21/42* (2013.01)
   *G06F 21/60* (2013.01)
   *G02B 27/01* (2006.01)

(56) References Cited

U.S. PATENT DOCUMENTS

| | | | |
|---|---|---|---|
| 2006/0277474 A1 | 12/2006 | Robarts et al. | |
| 2007/0024527 A1 | 2/2007 | Heikkinen et al. | |
| 2010/0146608 A1* | 6/2010 | Batie | G06F 21/32 726/7 |
| 2011/0134108 A1* | 6/2011 | Hertenstein | G06T 19/006 345/419 |
| 2011/0187743 A1 | 8/2011 | Hwang et al. | |
| 2011/0289430 A1* | 11/2011 | Frank | G06F 21/6218 715/753 |
| 2012/0092329 A1* | 4/2012 | Koo | G06K 9/3258 345/419 |
| 2012/0256917 A1* | 10/2012 | Lieberman | G06T 17/05 345/419 |
| 2013/0016375 A1* | 1/2013 | Hashidume | G06F 3/1222 358/1.9 |
| 2013/0032634 A1* | 2/2013 | McKirdy | G06Q 30/0271 235/375 |
| 2013/0044128 A1 | 2/2013 | Liu et al. | |
| 2013/0086465 A1* | 4/2013 | Boudville | G07F 19/201 715/234 |
| 2014/0002495 A1* | 1/2014 | Lamb | G06F 3/1431 345/633 |
| 2014/0111542 A1* | 4/2014 | Wan | G06F 17/30253 345/633 |
| 2014/0120981 A1* | 5/2014 | King | G06F 17/30265 455/556.1 |
| 2014/0331334 A1* | 11/2014 | Kamai | G06F 21/604 726/28 |
| 2015/0016777 A1* | 1/2015 | Abovitz | G02B 27/225 385/37 |
| 2015/0062120 A1* | 3/2015 | Reisner-Kollmann | G06T 7/0042 345/419 |
| 2015/0099946 A1* | 4/2015 | Sahin | A61B 5/16 600/301 |
| 2015/0348329 A1* | 12/2015 | Carre | G06Q 30/02 345/633 |

* cited by examiner

US 9,804,813 B2

AUGMENTED REALITY CROSS-DOMAIN SOLUTION FOR PHYSICALLY DISCONNECTED SECURITY DOMAINS

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 102709.

BACKGROUND OF THE INVENTION

Augmented reality and virtual display technologies are rapidly advancing due to widespread accessibility of hand-held devices with built-in cameras, inexpensive gyroscope, accelerometer, and camera sensors, and the ready availability of sophisticated image processing algorithms. The advent of application marketplaces has demonstrated a plethora of text and image processing apps which use sophisticated algorithms to recognize and augment real-world environments. There are also many successful implementations of text and image processing applications within the prior art. Many of the challenges of such systems relate to the difficultly of processing and recognizing objects in the physical environment.

SUMMARY

Described herein is a method for augmenting the display of information having a first sensitivity level with information having a higher sensitivity level comprising the following steps. The first step provides for displaying primary data having a first sensitivity level on a first display screen that is operatively coupled to a first computer. The next step provides for capturing an image of the first display screen with an image capture device that is operatively coupled to a second computer that is communicatively isolated from the first computer such that no data is shared between the first and second computers. The next step provides for executing with the second computer a display recognition and characterization algorithm to recognize the primary data based only on the captured image of the first display screen. The next step provides for augmenting the primary data by displaying secondary data on a second display, wherein the secondary data is related to, and has a higher sensitivity level than, the primary data.

The method for augmenting the display of information having a first sensitivity level with information having a higher sensitivity level may also be described as comprising the following steps. The first step provides for displaying primary data having a first sensitivity level on a first display screen that is operatively coupled to a first computer. The next step provides for capturing live video data of the first display screen with a camera that is operatively coupled to a second computer that is communicatively isolated from the first computer such that no data is shared between the first and second computers. The next step provides for executing with the second computer a display recognition and characterization algorithm to recognize the primary data based only on the video data. The next step provides for augmenting the primary data by displaying secondary data on a wearable, heads-up display viewable only to a user, wherein the primary and secondary data are both within the user's field of view when the user views the first display screen through the head-up display, and wherein the secondary data is related to, and has a higher sensitivity level than, the primary data.

Also described herein is a system for augmenting the display of information having a first sensitivity level with information having a higher sensitivity level comprising a first computer, a first display, an image capture device, a second computer, and a second display. The first computer is configured to process only data having up to the first sensitivity level. The first display screen is operatively coupled to the first computer and configured to display primary data having a sensitivity up to the first sensitivity level. The image capture device is configured to capture an image of the primary data displayed on the first display screen without connecting to, authorization by, or knowledge of the first computer. The second computer is operatively coupled to the image capture device and is configured to process data having up to a second sensitivity level. The second sensitivity level is higher than the first sensitivity level. The second computer is communicatively isolated from the first computer such that no data is shared between the first and second computers. The second display is operatively coupled to the second computer. The second computer is configured to execute a display recognition and characterization algorithm to recognize the primary data based only on the captured image of the primary data on the first display screen. The second computer is further configured to augment the primary data by displaying secondary data having a sensitivity up to the second sensitivity level on the second display.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The methods and systems described herein are for augmenting the display of information having a first sensitivity level with information having a higher sensitivity level. The system and method relate to augmented reality (AR) technology that provides an "overlay" of additional content which appears adjacent to and/or "on top of" display screens which are visible in a user's field of vision. The disclosed methods and system below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Within some computing environments information is required to be physically separated due to the sensitivity of the information. Information might be deemed sensitive due to impact that disclosure of the information may have; such as harmful impacts on the environment, facilities, operations, or personnel. This is particularly relevant for the protection of proprietary business information in a competitive business environment, protection of tactical military operational information in hostile wartime environment, protecting personal medical information from inadvertent public disclosure, and many other instances where guarantees of privacy are required to protect people, facilities, operations, or information systems from harm or destruction. In general, physical separation between computing systems (an air-gap) is one of the strongest way of guaranteeing that information will not leak or be inadvertently disclosed.

Figure 1:
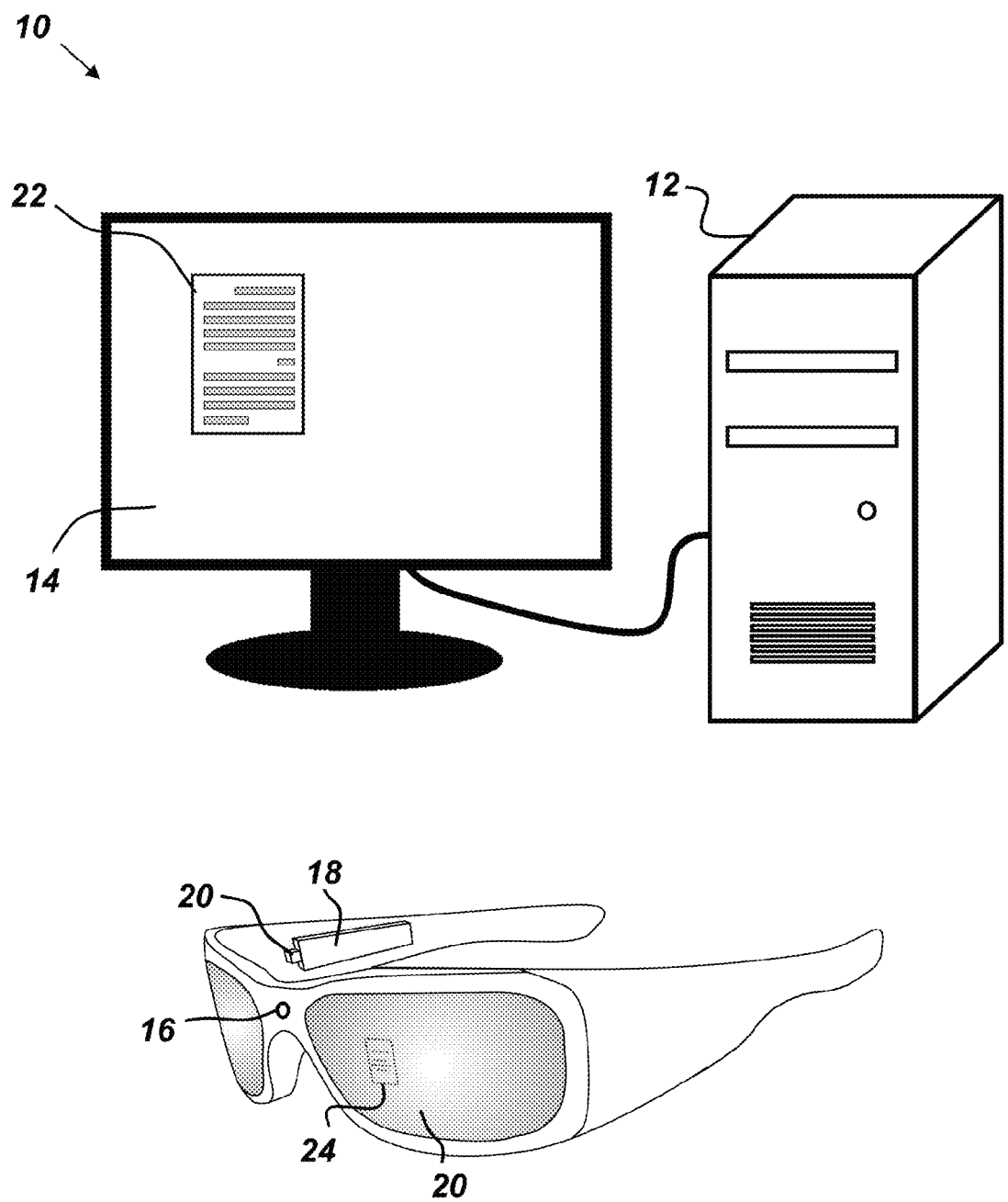
FIG. 1 is an illustration of an embodiment of a system for augmenting the display of information having a first sensitivity level with information having a higher sensitivity level.

FIG. 1 is an illustration of an embodiment of a system 10 comprising a first computer 12, a first display 14, an image capture device 16, a second computer 18, and a second display 20. The first computer 12 is configured to process only data having up to the first sensitivity level. The first display screen 14 is operatively coupled to the first computer 12 and is configured to display primary data 22 of only the first sensitivity level. The image capture device 16 is configured to capture an image of the primary data 22 displayed on the first display screen 14 without connecting to, authorization by, or knowledge of the first computer 12. The second computer 18 is operatively coupled to the image capture device 16 and is configured to process data having up to a second sensitivity level. The second sensitivity level is higher than the first sensitivity level. The second computer 18 is communicatively isolated from the first computer 12 such that no data is shared between the first and second computers 12 and 18 respectively. The second display 20 is operatively coupled to the second computer 18. The second computer 18 is configured to execute a display recognition and characterization algorithm to recognize the primary data based only on the captured image of the primary data on the first display screen 14. The second computer 18 is further configured to augment the primary data by displaying secondary data 24 of the second sensitivity level on the second display 20.

Figure 2:
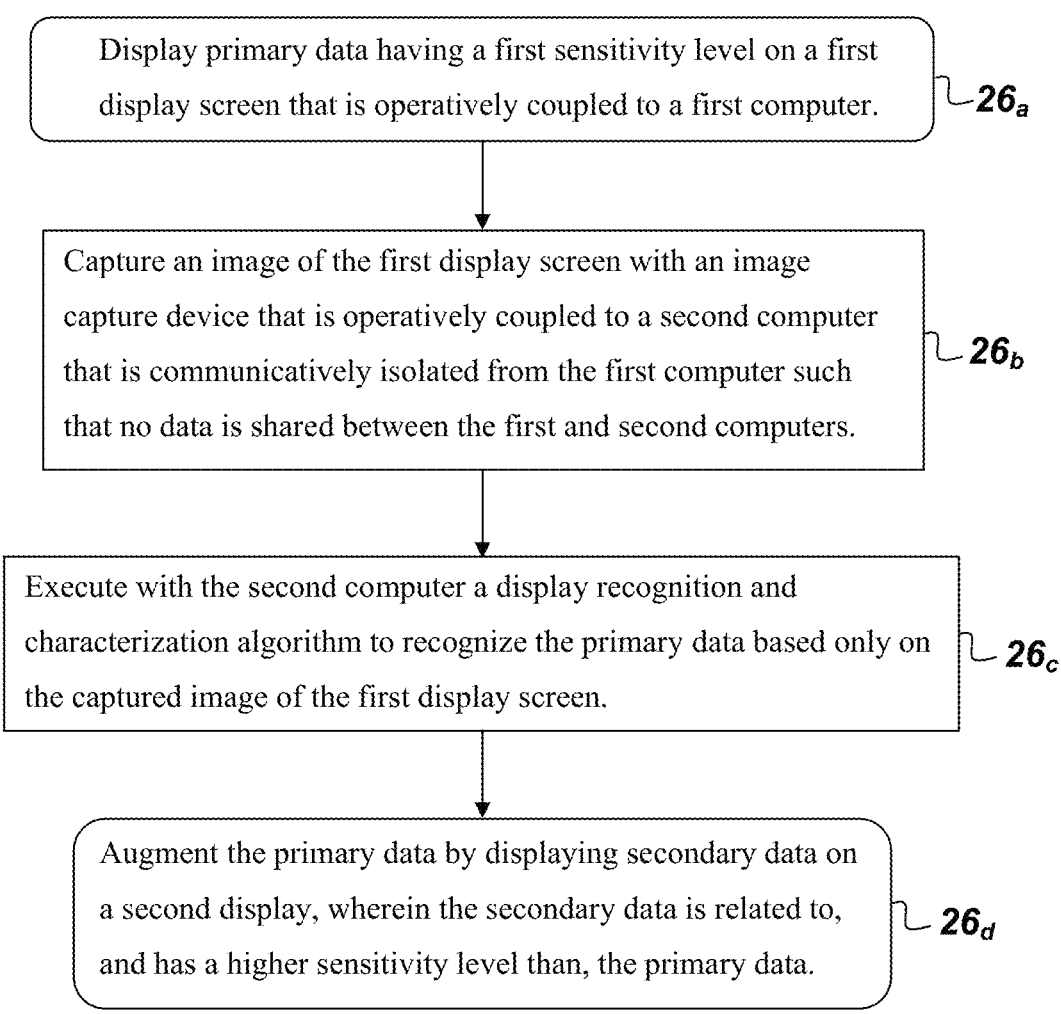
FIG. 2 is a flowchart of a method for augmenting the display of information having a first sensitivity level with information having a higher sensitivity level.

FIG. 2 is a flowchart of an embodiment of a method 26 for augmenting the display of information having a first sensitivity level with information having a higher sensitivity level. Method 26 comprises, consists of, or consists essentially of the following steps. Step $26_a$ of method 26 provides for displaying primary data having a first sensitivity level on a first display screen that is operatively coupled to a first computer. Step $26_b$ of method 26 provides for capturing an image of the first display screen with an image capture device that is operatively coupled to a second computer that is communicatively isolated from the first computer such that no data is shared between the first and second computers. Step $26_c$ of method 26 provides for executing with the second computer a display recognition and characterization algorithm to recognize the primary data based only on the captured image of the first display screen. Step $26_d$ of method 26 provides for augmenting the primary data by displaying secondary data on a second display, wherein the secondary data is related to, and has a higher sensitivity level than, the primary data.

The first computer 12 may be any processor capable of processing data and outputting data to the first display screen 14. Example embodiments of the first computer 12 include, but are not limited to: a desktop computer, a laptop computer, a server, a smart phone, and a tablet computer. The first display screen 14 may be any visual display capable of displaying data to a user. The image capture device 16 may be any device capable of capturing an image of the first display 14 and of sharing the captured image with the second computer 18 without connecting to and/or sharing data with the first computer 12. Suitable examples of the image capture device 16 include, but are not limited to, a digital, still camera and a digital video camera. The second computer 18 may be any processor capable of receiving the captured image, processing data, and outputting data to the second display 20. The second display 20 may be any display capable of displaying the secondary data 24 to a user. Suitable examples of the second display 20 include, but are not limited to: a heads-up display; Google Glass®; a wearable AR device; the Occulus Rift® virtual reality headset paired with suitable software and having an attached camera; and a "smartphone" such as a Google Nexus®, Samsung Galaxy®, or Apple iPhone® having a suitable built-in camera and AR software. The second display 20 may be hidden from the view of other users such that only the user in possession of the second display 20 is able to see or otherwise perceive information on the second display 20.

The sensitivity levels may correspond with any two sensitivity domains. For example, the primary data 22 displayed on the first display 14 may be information that is suitable for viewing by the general public and the secondary data 24 displayed on the second display 20 may be proprietary information. In another example, the primary data 22 may correspond to unclassified data and the secondary data 24 may correspond to SECRET data, according to a government information security classification system. In another example, the primary data 22 may correspond to SECRET data and the secondary data 24 may correspond to TOP SECRET data, as those terms are used in a government information security classification system. In another example, the primary data 22 may be information that is suitable for viewing by the general public and the secondary data 24 may include personally identifiable information. In another example, the primary data 22 may be information that is suitable for viewing by the general public and the secondary data 24 may be client-health information.

The systems and methods described herein may be used in a number of environments such as multi-classification or "multi-domain" environments with both classified and unclassified material which must be processed and displayed by physically separate computer systems. Other suitable environments include, but are not limited to: coalition environments with many individuals with differing access levels in addition to shared and common computer systems and displayed content; North Atlantic Treaty Organization (NATO) environments with similar access restrictions and shared information requirements; law enforcement digital forensics environments where law enforcement systems cannot physically connect to systems which are being examined due to the potential for contaminating information on such systems; and medical environments where patient data cannot be disclosed due to restrictions in the Health Insurance Portability and Accountability Act (HIPAA) but where the patient data should be available and displayed in context when a doctor performs research on patient health issues.

Other uses of the systems and methods described in the claims include, but are not limited to, the provision of a personal AR system that provides personalized views which augment shared/common displays of: patient health data in a common area without disclosing patient identities (where an individual patient identity associated with a given set of health data is displayed on the second display 20); computer displayed commercial advertisements (to highlight items of potential individual interest without providing companies with information of such interest); display of flight schedules (e.g. to highlight flights, cities, or the flights of known associates or family members). In each of these use cases data is neither shared nor transmitted between the second computer 18 and the first computer 12.

The systems and methods claimed herein enable a novel application of AR display capabilities in which the second computer 18 is used to augment the first display 14 and where the two computer devices (the first and second computers 12 and 18 respectively) are not connected and cannot share or transmit data. Because of the lack of "backchannel" data sharing between the devices we have taken a different approach to object recognition and augmented display, relying on both text and image processing as well as optional dynamic visual codes which are displayed on the first display 14 and recognized by specialized algorithms running on the second computer 18. The claimed methods and systems enhance a user's view of the first display 14 which otherwise would not be possible because the first display 14 and the second display 18 are physically separate and do not communicate via a computer network or direct connection (e.g. physical cable, WiFi, Bluetooth, etc.).

Figure 3:
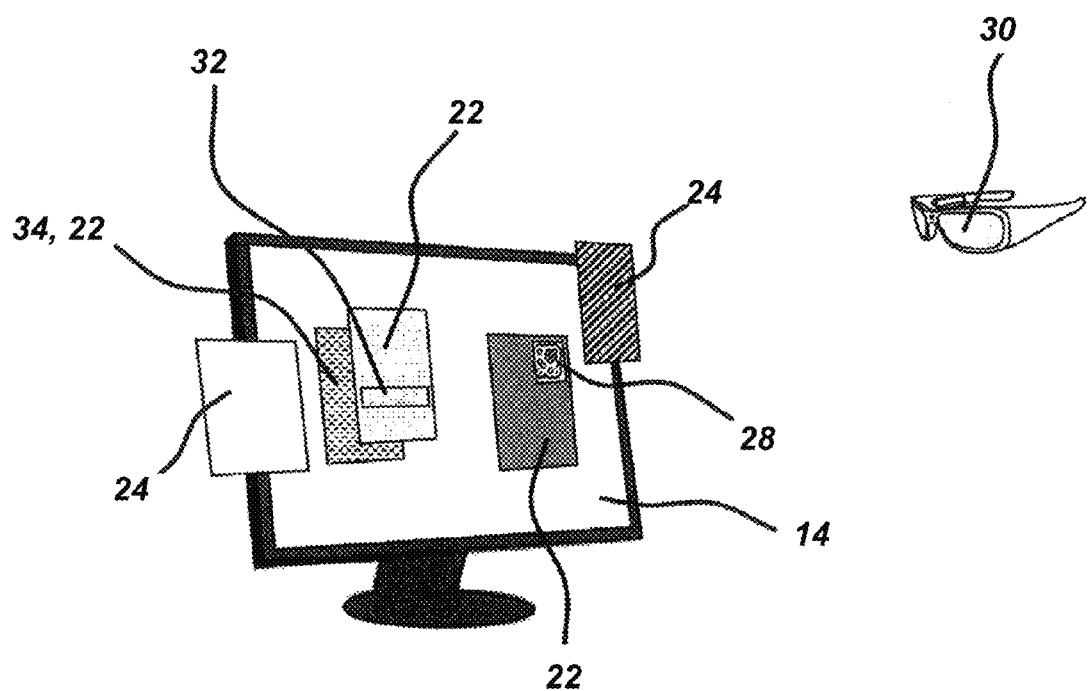
FIG. 3 is an illustration of an embodiment of a system for augmenting the display of information having a first sensitivity level with information having a higher sensitivity level.

FIG. 3 is an illustration of system 10 wherein the first display 14 is further configured to display an optional visual marker 28. The visual marker 28 may be any visual code that can be recognized by the second computer 18 from the image of the first display 14 captured by the image capture device 16. As used herein, suitable embodiments of the visual marker 28 may include, but are not limited to, any of the following: computer vision (CV) markers; matrix codes; two-dimensional bar codes; CyberCode™; visual tags; visual codes; quick reaction (QR) codes; Data Matrix codes; fiducial markers; etc. In a conventional AR approach, visual codes are generally already known by the AR system (e.g. fiducial makers). The second computer 18 may be configured to extract small amounts of metadata from each marker which may be used as search criteria or for direct use as Universal Resource Indicators (URIs) without connecting to, authorization by, or knowledge of the first computer 12. The visual marker 28 may time-coded in that is may change over time depending on the content of the primary data 22. The use of dynamic, on-screen codes allows for the second computer 18 to display supplementary data on the second display 20 which cannot be displayed on the first display 14 due to issues of classification, security, privacy, or an innate difficulty in data transmission between devices.

In one embodiment, system 10 allows the second computer 18 to operate in a disconnected manner such that it could be used within a secure facility to augment the display of unclassified primary data 22 displayed on the first display 14 with classified secondary data 24. In the embodiment of the system 10 where the second display is a wearable AR display, a first user wearing the AR display may be given access to information (i.e., the secondary data 24) which is not displayed on the first display 14. A second user (not wearing the AR display) who sees the first display 14 would not be provided and would not know about the secondary data 24 displayed only to the first user on the second display 20. In another embodiment of the system 10, several different users may each have a personal, wearable second display 20 and the secondary data 24 displayed on each wearable second display 20 may be tailored to the respective security clearance/need-to-know of each individual user. In other words, different individuals with separate AR systems could be given different AR displayed information or no AR displayed information in association with the primary data 22 visible by all the users on the first display 14.

In FIG. 3, the second computer 18, the second display 20, and the image capture device 16 are all integrated into a lightweight, wearable heads-up-display device 30 with the ability to process incoming video data from an attached front-facing camera embodiment of the image capture device 16. The heads-up-display device 30 is capable of displaying high-resolution text and images which appear to be embedded within and adjacent to objects within the user's physical environment. Suitable examples of the heads-up-display 30 are commercially available and would provide the basic image capture and image processing capability when coupled to a sufficiently capable graphics processing unit (GPU) or general-purpose central processing unit (CPU). As such, an embodiment of the heads-up-display 30 could be implemented using any off-the-shelf AR hardware that provides a sufficiently private viewing experience and sufficient computing capabilities for real-time video processing.

One way of making the heads-up-display 30 lightweight is to offload video processing to a connected to a general-purpose CPU as might be provided by a handheld computing device (such as a smartphone or similar device). Such a device could also act as a stand-alone storage device to contain all of the data needed to augment surrounding first displays 14 with classified or personalized information. An embodiment of the heads-up-display 30 would not rely on visual markers 28 embedded in the primary data 22 such as fiducial markers or CV markers. Rather, the aforementioned embodiment of the heads-up-display 30 would be capable of recognizing objects, text, graphics, and images on any computer display. Reference character 32, shown in FIG. 3, corresponds to a portion of text displayed on the first display 14 that is recognized by the second computer 18. Reference character 34, shown in FIG. 3, corresponds to a partially-obscured application window displayed on the first display 14.

Figure 4:
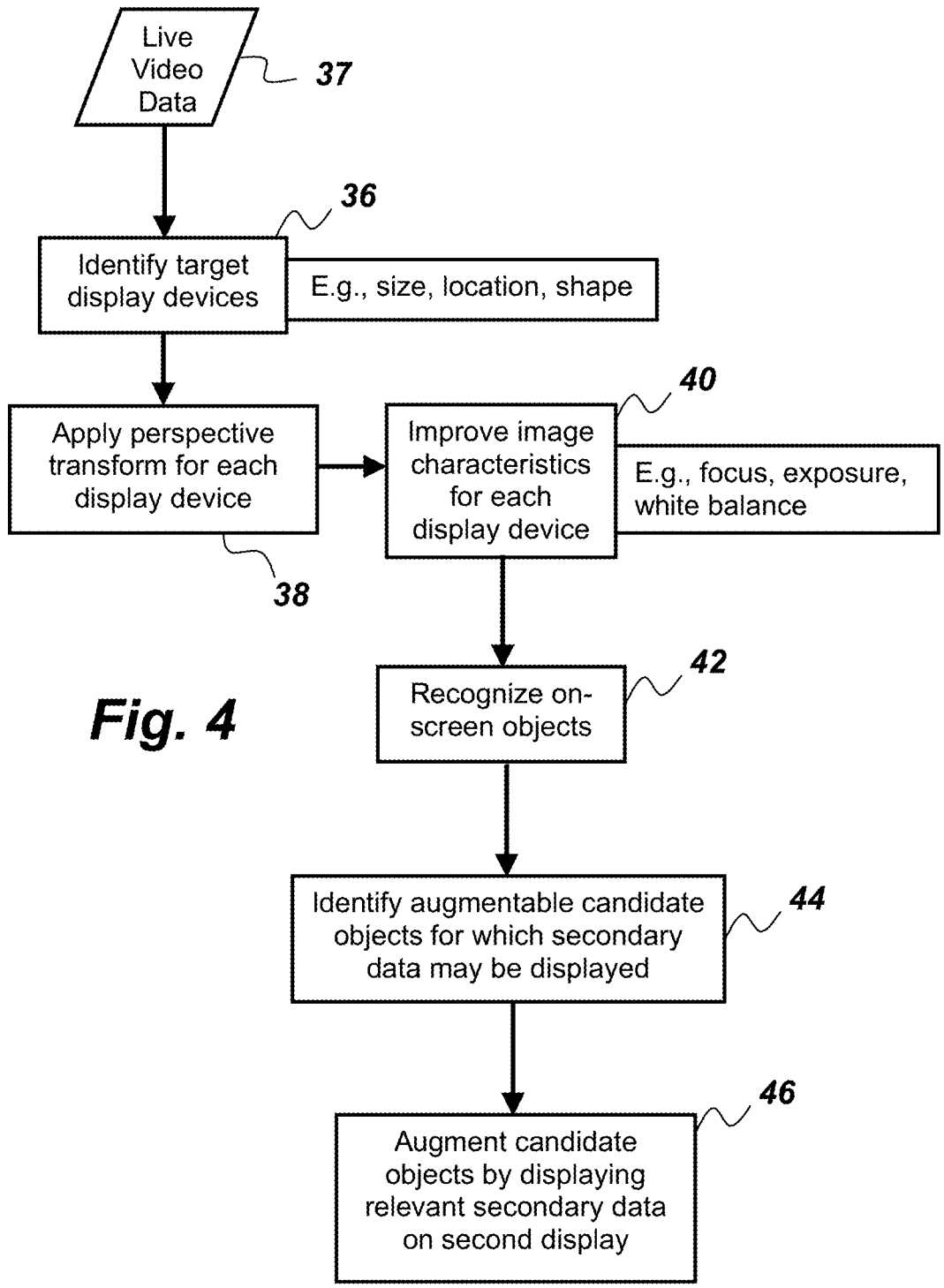
FIG. 4 is a flowchart depicting steps of a display recognition and characterization algorithm.

FIG. 4 is a flowchart depicting steps of a display recognition and characterization algorithm that may be employed by the heads-up-display 30. The first step 36 provides for identifying display devices based on live video data 37 that includes the captured image of the first display 14. The second step 38 provides for applying a perspective transform to each identified display to compensate for the variety of angles at which the first display 14 may be positioned with respect to the image capture device 16. The third step 40 provides for improving image and camera characteristics for improved image quality for each region within the video stream which contains a display device. The fourth step 42 provides for applying object recognition algorithms to screen content on each video stream region. The fifth step 44 provides for recognizing on-screen objects which are suitable candidates for augmentation. The sixth step 46 provides for inserting augmentations into the second display 18 shown to the user of the heads-up-display 30.

More specifically, in reference to the display recognition and characterization algorithm and the flowchart shown in FIG. 4, a general-purpose embodiment of the heads-up-display 30 would first process the incoming image data to identify first displays 14 visible within the field of view of the image capture device 16. Potential first displays 14 can be identified using image processing algorithms to identify rectangular and off-angle 4-sided polygon shapes. Peculiarities of common display technologies can also be used to identify regions of the captured image and/or live video data 37 that are likely to contain images of first displays 14. For example, each display technology transmits light with a color gamut which is often specific to the display and the tuning of the display. Known profiles of common display color gamuts can be used to match regions of the captured image and/or a still frame of live video data 37 as first displays 14. Off-angle views of first displays 14 may be identified using readily available algorithms, such as line detection algorithms, parallel line recognition algorithms, perspective rectangle detection, skew transforms, etc.

Once a potential first display 14 is identified, on-screen content may not be visible due to focus, exposure, color, and contrast settings of the image capture device 16. Each screen rectangle (or polygon) might need specific settings adjustments due to peculiarities in the screen characteristics or due to off-angle viewing characteristics (such as color issues common to liquid-crystal based display devices). For each display screen polygon the image capture device 16's exposure and other settings may then be dynamically adapted based on the brightness of an identified first display 14 or group of first displays 14. Automated exposure, white-balance, contrast and other adjustment algorithms are readily available to one having ordinary skilled in the art and knowledgeable of available image processing algorithms. Examples of such algorithms include: contrast factor estimation, intensity normalization, histogram matching, histogram equalization, detail-preserving S-curve adjustment, over-exposure likelihood estimation and compensation, color gamut correction, and others.

In system 10, the potential first displays 14 are identified first so that image quality can be optimized based on the first display 14 characteristics instead of average environment and lighting characteristics of the entire captured image and/or the live video data 37. By first identifying potential display devices, the afore-mentioned algorithms can work optimally based on the brightness, color gamut, and contrast characteristics of each individual display 14. Additionally, regions of the captured image that do not contain an image of the display 14 may be used to estimate ambient lighting conditions in order to inform the image correction algorithms. An embodiment of system 10 can also incorporate one or more hardware light meters for estimation of ambient lighting conditions. System 10 may also be configured such that image regions surrounding or otherwise adjacent to each of several individual regions of the captured image can individually inform image correction algorithms of ambient lighting conditions. An embodiment of system 10 would be capable of independently optimizing several identified screen areas simultaneously and independently so that later steps in image processing can proceed with the best possible image quality for each identified screen. In other words, system 10 may be configured to segment the captured image into multiple segments if multiple first displays 14 are identified in the captured image such that each segment corresponds to a respective first display 14. If several first displays 14 are identified, the second computer 18 may be configured to simultaneously or sequentially apply the object recognition and characterization algorithm to each segment of the captured image. Each segment of the captured image can be used independently to infer display characteristics (such as color gamut) of each individual screen region detected.

Once the first display 14 is identified and the image quality optimized, the object recognition and characterization algorithm may process the first display 14 to search for recognizable objects, text, and images (such as software user interface elements, buttons, icons, menus, text, and images). The performance of the object recognition and characterization algorithm may be improved by incorporating knowledge of the software environment of the first computer 12. A Microsoft Windows® graphical-user-interface (GUI) uses different display elements than a Mac OS® GUI. Prior knowledge of the GUI environment of the first display 14 allows the object-recognition and characterization algorithm to correctly and quickly identify on-screen elements while reducing computational overhead. In one embodiment of the object-recognition and characterization algorithm, the second computer 18 is preloaded with knowledge of the existing fonts on a variety of computer systems so that optical character recognition (OCR) can be accomplished with minimal effort. In other words, the display recognition and characterization algorithm uses an OCR algorithm adjusted to recognize computer-generated fonts. One aspect of the on-display object recognition approach is that knowledge of the viewing angle, skew transforms, and screen optical characteristics (which were learned through the application of image transforms and image processing algorithms) allows the on-screen object recognition and characterization algorithm to adjust its knowledge of expected on-screen objects by applying a perspective transformation to each object's shape and image correction algorithms to each object's optical characteristics (such as color gamut correction). That is, the screen's physical dimensions (as it is seen at a particular angle) imply that each on-screen object will be transformed in the same manner. Similarly, the screen's optical characteristics imply that each on-screen object will be corrected in the same manner. Using this knowledge and knowledge of the GUI environment elements and semantics allows the recognition of on-screen objects to be performed very quickly using minimal computing overhead.

Once on-screen objects are identified, a search may be performed to identify suitable candidates for augmentation. The best candidate objects will contain sufficient information to determine useful data to overlay that is not present on the first computer 12. The recognition engine may be identifying text via OCR, images using image and object recognition algorithms, or embedded metadata using CV and fiducial markers. Recognition of computer user interface semantics also allows the heads-up-display 30 to choose a location for placement of virtual objects that compose the secondary data 24. The placement of secondary data 24 may depend on how a user is interacting with the first computer 12 and the first display 14. For a user sitting in front of or otherwise actively using the first computer 12 and the first display 14, an appropriate location for a virtual object would be chosen so as not to obscure currently displayed primary information 22 on the first display 14 or user interface elements of the first display 14. For a user standing at some distance from the first display 14, obscuring some elements of the user interface or display may be acceptable or even desirable. In some embodiments, obscuring elements of the first display 14 may be desirable so that corrected or replacement information may be shown to the user instead of the original content.

In the case of open-ended object recognition, many possible augmentations may be possible and selecting a suitable augmentation is often a difficult design choice based on the desired operation and purpose of an embodiment of the system 10. For example an embodiment of system 10 could be designed to augment the first display 14 by calling up, and presenting on the second display 20, classified technical reports that relate directly to the primary data 22 displayed on the first display 14. Other embodiments may display on the second display 20 patient data (such as a patient history) for patients identified using unique visual markers 28 embedded within anonymized documents on the first display 14. The first computer 12 may be configured to automatically annotate and tag the primary data 22 using the visual markers 28. Alternatively such system 10 may be designed to allow a user to manually annotate screen content with appropriate visual markers 28. The optional visual markers 28 allow for more specific augmentations of the first display 14 as well as more accurate tracking of the screen surface and screen optical characteristics of the first display 14 as well as the perspective transformations and image transforms needed to properly augment the first display 14.

Rather than an open-ended search for suitable candidates for augmentation, in an embodiment of system 10, the second computer 18 may be configured to recognize only a pre-defined set of visual markers 28 which allow for several different modes for identifying augmentation candidates. Suitable example uses for which the visual markers 28 may be used by the second computer 18 include, but are not limited to: a) specifying the data, images or display elements on the first display 14 which should be augmented; b) providing a universal resource identifier (URI) or other identification code for retrieval of specific augmentation data; c) providing a set of metadata or search strings which can be used by the second computer 18 to find augmentations on an AR datastore; d) identifying where on the second display 20 augmentations should appear as overlays to the first display 14; e) identifying individual first displays 14 by a unique identifier; f) facilitating accurate tracking of the first display 14 surface, orientation, and physical characteristics (e.g. skew and perspective distortion); g) encoding of primary data 22 content (such as metadata or description of images, summarizations or full-text of text documents) eliminating the need for OCR; h) facilitating discovery of each first display 14 in the captured image; and i) facilitating accurate modeling of each first display 14's optical characteristics (the visual marker having a known pattern, size, scale, and color characteristics from which differential measurements can be learned).

Differential measurement using a known marker 28 can allow each of the screen color characteristics, ambient lighting conditions and effects, and physical transform characteristics (such as skew) to all be accounted for using one or more visual markers of known characteristics. In this way the visual markers 28 may be used as a calibration mechanism. The visual markers 28 do not need to be shown within the active region of the first display 14, but may also be placed adjacent to the first display 14 or even surrounding the first display 14. This may facilitate accurate tracking of display characteristics or may facilitate first display 14 discovery. The visual markers 28 displayed on the first display 14 do not need to be fixed, but might also convey information directly using a marker which is time-coded as well as spatially coded. The use of time-coded visual markers 28 also greatly improves the bandwidth of data that can be transmitted from the first display 14 into the second computer 18. In addition, the second computer 18 may extract from the visual marker 28 data that identifies the computing context of the first computer 12 (e.g., operating system, which application/program is running, etc.). The visual marker 28 may also include, but is not limited to, information regarding user context (e.g., which user is logged in), cyber security context (e.g., whether anti-virus software is up to date, whether the running application is approved for use on the first computer 18, etc.), and the sensitivity level of the primary data 22.

System 10 may be used to display information of multiple classifications within the same visual space for an individual user. System 10 uses AR to enable an individual to carry information from a more restricted system along with them into an unrestricted environment, and to consult this information in the context where it would be most useful. Security may be preserved with embodiments of system 10 which augment only the individual user's environment, while the second display 20 remains invisible to others. An embodiment of system 10 may be configured to recognize only the first display 14 and not other objects in the physical environment. System 10 is capable of recognizing the primary data 22 displayed on the first display 14 and augmenting the primary data 22 with additional content, ie., the secondary data 24, by displaying the secondary data 24 on the second display 20.

A handheld tablet or phone may be used as the second display 20, although this introduces the risk of disclosing the secondary data 24 to nearby parties. The second display 20 may even incorporate a display that resides within a contact lens. System 10 may further be configured to augment other senses of the user. For example, an embodiment of system 10 may further be configured to automatically process audio (or visual) cues from the environment to provide relevant audio data (classified voice recordings, etc) to the user through headphones or ear buds 50, such as those shown in FIG. 5. In general, any environmental cue (visual, aural, temperature, magnetic field, geographic location) could be used by system 10 to confidentially provide relevant information to the user in any mode of sensing (visual, aural, haptic, olfactory).

Figure 5:
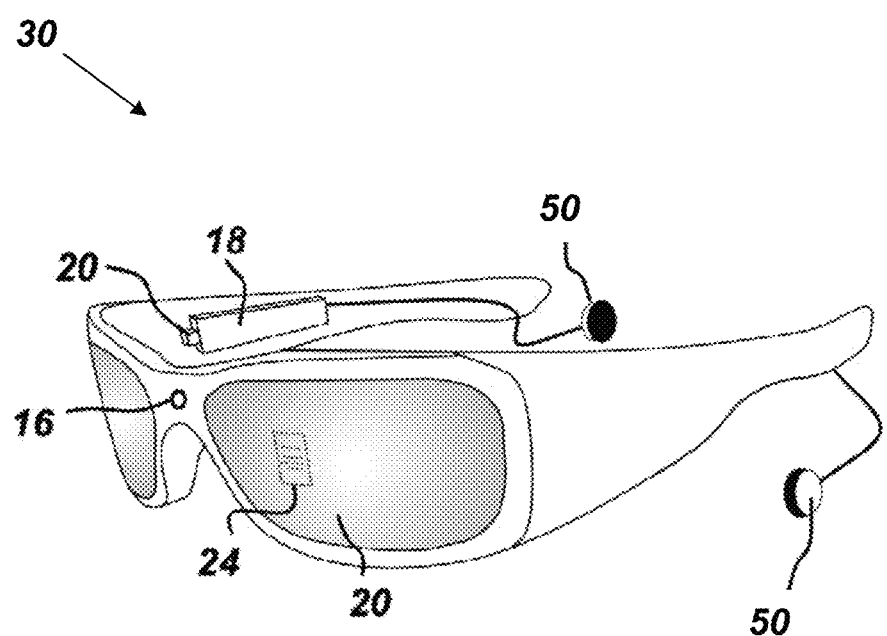
FIG. 5 is an illustration of an embodiment of the heads-up display device.

FIG. 5 is an illustration of an embodiment of the heads-up display device 30. This embodiment of the heads-up display device 30 could provide "action cues" to the user in addition to providing data overlays. Action cues are specialized indicators to prompt the user to take some action in their environment, which would be based on information from the higher sensitivity level. These cues could help users apply restricted or sensitive information in an unrestricted environment, for example by using the aforementioned image processing algorithms and techniques to identify a physical keypad and augmenting the user's field of vision with the keypad access code or directly highlighting the correct keys as the user presses them; or by identifying a password field on the primary information display and displaying the corresponding password on the second display 20. In the keypad scenario described above, the first display 14 may be the keypad (being either a digital display or a physical keypad with physical buttons), and/or the password field (being resident within the graphical user interface of a first display 14).

The heads-up display device 30 may also be configured to provide "warning cues" to the user. Warning cues are specialized indicators to alert the user to potential information domain breaches or potentially incorrect or misleading information contained in the primary data 22. One example of this is using existing QR codes or other fiducial markers to associate a relatively lower information domain with the primary data 22 contained on the first display 14; in the event that sensitive information from the higher sensitivity domain has inadvertently leaked from the higher sensitivity level and is being displayed in the first display 14, the second computer 18 would place an indicator of this fact on the second display 20 in the user's field of vision and alert the user to take further action.

The heads-up display device 30 may be further configured to use commonly available textual analysis algorithms to extract a dictionary of key phrases and terms from sensitive information that is currently augmenting the user's field of vision, and use commonly available speech recognition algorithms to track topics and phrases under discussion by the user and those around them. In the event that the topic or phrases under discussion include information from a sensitivity level that should not be discussed in the given environment, the heads-up display device 30 may be configured to alert the user visually and/or audibly about the potential information leakage event and to show the location or source of the information leakage on the second display 20.

The heads-up display device 30 may be configured to allow users with varying information privileges to collaborate safely by identifying which users have access to which information. Using face recognition techniques and badge markers, the heads-up display device 30 may be configured to identify other collaborators in the same physical space as the user, and to check their information privileges with a central database or directory. As the heads-up display device 30 augmented the user's workspace with sensitive secondary data 24, the heads-up display device 30 may be configured to provide visual indications to the user of which other people in their workspace could access the same sensitive secondary data 24. This has the potential to greatly speed discussions in multi-domain environments, since although sensitive information may not be discussed directly, those working with a particular piece of information would have instant visibility into who else in their workspace was apprised of the same data.

The heads-up display device 30 may be further configured to use a CV or fiducial marker as a form of encryption key to unlock further information in the environment. There are many possible embodiments in which this approach can be implemented and used. For example, when a marker is embedded into a document, the marker can contain or be used as an encryption key to unlock information or the content of other markers in future documents. When the heads-up display device 30 is shown a marker containing an encryption key, the second computer 18 can store the encryption key for later use. When a new document is shown which is cypher-text, the second computer 18 can decrypt the cypher text on the fly and display the decrypted content on the second display 20. The heads-up display device 30 may have encryption keys preloaded and ready for use in decryption of sensitive information.

In an embodiment of system 10, the heads-up display device 30 may be further configured to recognize markers which contain the fingerprint of the correct encryption key to use for decryption of cypher-text shown on the same page or screen region or otherwise associated with the encryption key. The second computer 18 may already know the encryption key, and may have many individual encryption keys. Recognition of the maker can allow the second computer 18 to select the correct encryption key for the context.

In an embodiment of system 10, the heads-up display device 30 may be configured to identify instances of sensitivity escalation when combining multiple documents that individually don't contain sensitive information. However, when a person comes across all these documents and their respective markers (keys), the cumulative information may be sensitive. In government or military information systems the aggregation of unclassified information may result in information which has a higher sensitivity, requiring treatment as sensitive but unclassified information, or may result in requiring a higher classification such as SECRET or TOP SECRET. The heads-up display device 30 may be configured to inform the user that the combined information is sensitive or classified. In some cases the fact that the information can be combined would itself be sensitive. Additionally, the heads-up display device 30 may be permitted to unlock additional internal information and to subsequently present the augmented info to the user.

In another embodiment of system 10, which is related to the scenario of documents becoming classified due to combinations, the second computer 18 may be configured to determine the information which has already been viewed by the user in order to determine the content of the secondary data 24 displayed to the user on the second display 20. This generally relates to "need to know". If a user already has access to Document A and Document B, a rule-based machine reasoning algorithm can determine whether the user's previous 'need to know' logically translates to a 'need to know' of Document C. That is, because Document C is strictly the combination of A and B, then he/she should logically have a need to know for Document C. This embodiment of system 10 uses an augmented reality approach to detecting which documents have been seen based on a simple set of basic access controls, and utilizes strong encryption to give access to additional information based on the transitive property of combinations of sensitive information.

Figure 6:
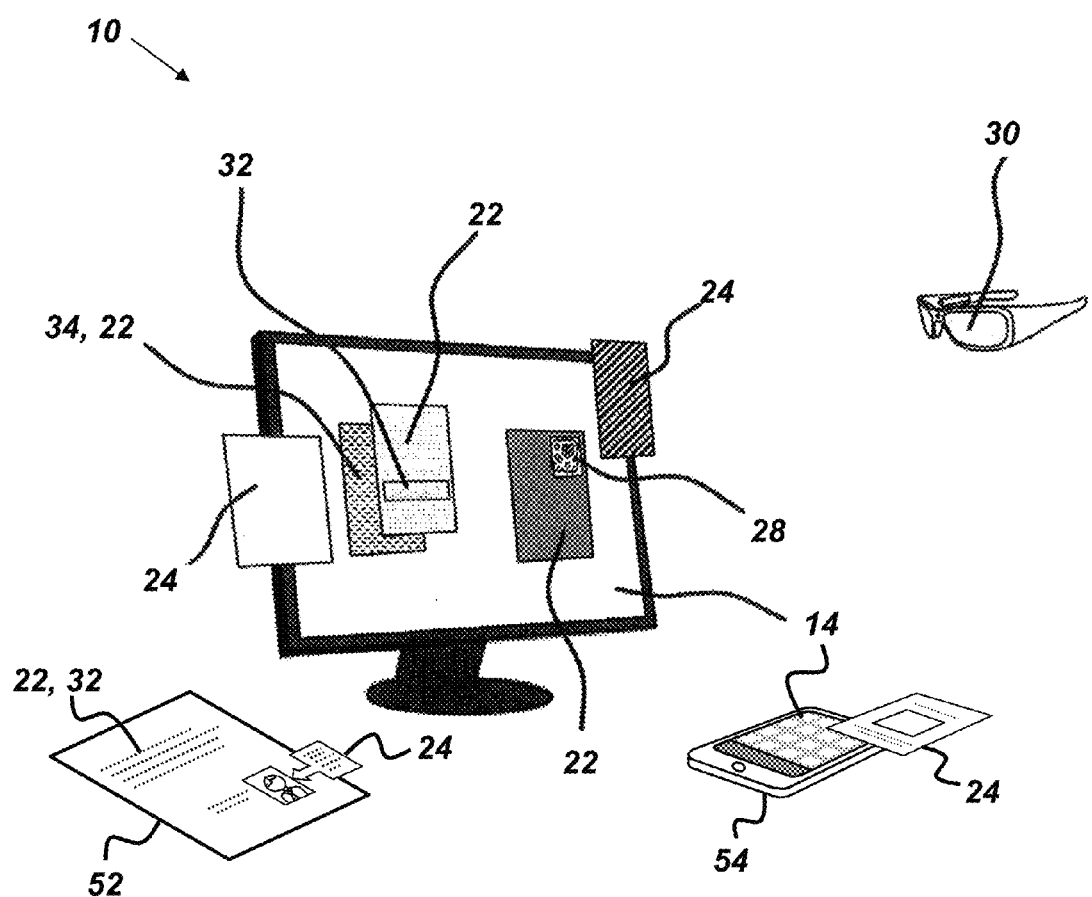
FIG. 6 is an illustration of an embodiment of a system for augmenting the display of information having a first sensitivity level with information having a higher sensitivity level.

FIG. 6 is an illustration of an embodiment of system 10. The aforementioned screen recognition algorithms, image shape transformations, and optical calibration algorithms can be adapted for the recognition of printed materials 52 on various materials (such as a plastic picture badge) as well as the first displays 14. Printed materials generally contain computer generated fonts and other objects which are commonly shown on computer displays. As such, the methods for recognizing many of the common data elements are similar. Print substrates (commonly thin sheets of paper or plastic) also have identifiable optical characteristics which can be used for efficient discovery of image capture regions. In this way, the second computer 18 of system 10 can also be used to differentiate between first displays 14 and non-display rectangular objects in the environment (such as the printed material 52 which may include sheets of paper with printed text, picture badges, paper receipts, etc.). One reason that we may desire to recognize other rectangular surfaces is so that we can prevent these regions of the captured image from being considered as a first display 14, such as the smart phone 54 embodiment of the first display 14 shown in FIG. 6. By calibrating the algorithm for shape and optical characteristics peculiar to various rectangular printed materials 52, we can better ensure that surfaces which are detected are actually first displays 14. Another application of the printed material detection algorithm allows for augmentations of the printed material 52, when the printed material 52 contains primary data 22. The printed material 52 may also contain optical markers 28, which may relate to the same set of indicators as for first displays 14 (such as the classification or sensitivity of the written text, encryption keys and encryption key fingerprints, etc, search criteria, a universal resource indicator (URI), computing context information, user context information, security context, and the sensitivity level of the primary data). By combining the recognition of first displays 14 and printed material 52 the system 10 is capable of combining information between the two sources of different primary data 22. By combining this information, decisions on derivative classification, or of computing transitive classification attributes, can be made by the second computer 18. For example, if a user was holding a printed page of a properly marked classified document, the system 10 could recognize the printed material 52, process this material, and then search for the same text within nearby first displays 14 and/or in the secondary data 24 stored in the second computer 18. In this way the system 10 can use a physical document to discover potential data leaks between information sensitivity levels.

The second computer 18 may be configured to combine recognition of markers with other augmented reality capabilities, such as ensuring that an individual should have access to sensitive information. For example, system 10 could use markers on the badge of an individual to pull up information related to the user's level of access to sensitive information. By combining information stored in the marker and/or combining the marker information with data stored on an authentication server along with face recognition, the heads-up display device 30 could assist in verifying access. The second computer 18 may be configured to combine trusted information with facial recognition or other feature recognition algorithms to verify identity. In this case the marker is used to indicate a unique ID number that is associated with the person being verified. This embodiment of system 10 could also be used to enforce "need to know" rules for access to sensitive information. Once identified, an identified user who is wearing an embodiment of the heads-up display device 30 can be shown an encryption key marker. Once seen by the heads-up display device 30, this encryption key marker can then be used to decrypt information for which the identified user has a "need to know."

The "need to know" rules may also require that the user receive visual markers 28 in a particular sequence. Based on the sequence or upon the combination of markers seen by the heads-up display device 30, the second computer 18 can unlock sensitive information appropriately. There are many examples where the order in which documents are viewed is important. Often a user is given access based on a prior judgment. System 10 may be configured to allow the user access to the secondary data 24 only after the user reviews the classification guidance or indoctrination requirements. While reviewing the guidance the second computer 18 perceives markers which allow the user additional access. For example, government facilities which handle classified information often require that employees read procedures on how to handle classified documents before the employee is actually allowed to handle classified material. For example, the heads-up display device 30 may be configured to not do anything with Document B until it has seen the marker in Document A.

Commercial use of the approach described in the paragraph above would ensure that people read User Terms and Agreements, which limit the company's liabilities. For example, each page of a legal agreement may include a marker and the heads-up display device 30 may be configured to only unlock or decrypt the secondary data 24 once the computer 18 has recognized each marker—indicating that the user has viewed each page of a legal agreement. These markers may indicate the location of encryption keys or contain the encryption keys which would subsequently be used for decrypting sensitive information.

From the above description of the methods and systems for augmenting the display of information having a first sensitivity level with information having a higher sensitivity level, it is manifest that various techniques may be used for implementing the concepts described herein without departing from the scope of the claims. The described embodiments are to be considered in all respects as illustrative and not restrictive. The methods and systems for augmenting the display of information having a first sensitivity level with information having a higher sensitivity level disclosed herein may be practiced in the absence of any element that is not specifically claimed and/or disclosed herein. It should also be understood that the invention as claimed is not limited to the particular embodiments described herein, but is capable of many embodiments without departing from the scope of the claims.

We claim:

1. A method, comprising the steps of:
    displaying to a first user primary data having a first sensitivity level on a first display screen that is operatively coupled to a first computer;
    capturing an image of the first display screen with an image capture device that is operatively coupled to a second computer comprising a second display wherein the second computer is communicatively and physically isolated from the first computer such that no data, other than the captured image, passes between the second computer and the first computer, wherein the first computer has no knowledge that the second computer is capturing the image of the first display screen;
    executing, with the second computer, a display recognition and characterization algorithm to recognize the primary data based only on user-recognizable objects in the primary data visible in the captured image of the first display screen without the use of fiducial markers, bar codes, quick reaction codes, or nonvisible metadata; and
    augmenting the primary data by at least one of displaying secondary data to a second user on the second display, wherein the secondary data is related to, and has a higher sensitivity level than, the primary data.

2. The method of claim 1, wherein the display recognition and characterization algorithm comprises the steps of:
    receiving the captured image of first display screen;
    identifying the first display screen and determining the size, shape, and location of the first display screen;
    applying a perspective transform for the first display screen to adjust for the angle of the first display screen in the captured image;
    adjusting image characteristics of the captured image to increase perception of objects on the first display screen;
    perceiving objects displayed on the first display screen; and
    identifying candidate objects for which augmenting secondary data may be displayed on the second display.

3. The method of claim 2, wherein the image characteristics optimized by the display recognition and characterization algorithm comprise at least one of focus, exposure, and white balance.

4. The method of claim 2, further comprising the step of segmenting the captured image into multiple segments if multiple displays are identified in the captured image such that each segment corresponds to a respective display, and wherein the steps of applying the perspective transform, adjusting image characteristics, perceiving objects, identifying candidate objects, and augmenting are performed simultaneously and independently by the second computer for each segment of the captured image.

5. The method of claim 2, wherein the objects perceived by the second computer comprise at least one of the following objects: text, images, icons, and user-interface elements.

6. The method of claim 5, wherein the display recognition and characterization algorithm uses an optical character recognition algorithm adjusted to recognize computer-generated fonts.

7. The method of claim 1, wherein the second display is a wearable heads-up display viewable only to the second user, and wherein the primary and secondary data are both within the second user's field of view when the second user views the first display screen through the heads-up display.

8. The method of claim 7, wherein the secondary data is replacement information positioned on the second display so as to obscure a portion of the primary data from the second user such that the replacement information replaces the portion of primary data from the perspective of the second user.

9. The method of claim 1 wherein the first sensitivity level and the higher sensitivity level correspond to two different levels of a government's information classification system.

10. The method of claim 1, wherein the first sensitivity level is commensurate with information that may be released to a general public and the secondary data is protected health information.

11. The method of claim 1, wherein the image capture device is a video camera.

12. A method, comprising the steps of:
  displaying to a first user primary data having a first sensitivity level on a first display screen that is operatively coupled to a first computer;
  capturing live video data of the first display screen with a camera that is operatively, and physically, coupled to a second computer comprising a wearable, heads-up display wherein the second computer is communicatively isolated from the first computer such that no data, other than the captured video data, passes between the second computer and the first computer, wherein the first computer has no knowledge that the second computer is capturing live video data of the first display screen;
  executing, with the second computer, a display recognition and characterization algorithm to recognize the primary data based only on user-recognizable objects in the primary data visible in the video data without the use of fiducial markers, quick reaction codes, bar codes, or nonvisible metadata; and
  augmenting the primary data by displaying secondary data on the wearable, heads-up display viewable only to a second user, wherein the primary and secondary data are both within the second user's field of view when the second user views the first display screen through the head-up display, and wherein the secondary data is related to, and has a higher sensitivity level than, the primary data.

13. The method of claim 12, wherein the display recognition and characterization algorithm comprises the steps of:
  receiving the video data;
  identifying the first display screen and determining the size, shape, and location of the first display screen from the video data;
  applying a perspective transform for the first display screen to adjust for the angle of the first display screen in the video data;
  adjusting image characteristics of the video data to increase perception of objects on the first display screen;
  perceiving objects displayed on the first display screen; and
  identifying candidate objects for which augmenting secondary data may be displayed on the heads-up display.

14. A method for augmenting unclassified data displayed on a first display screen with classified data on a second display screen, comprising the steps of:
  displaying to a first user unclassified data on the first display screen that is operatively coupled to a first computer;
  capturing live video data of the first display screen with a camera that is operatively coupled to a second computer comprising a wearable, heads-up display wherein the second computer is physically separated and communicatively isolated from the first computer such that no data, other than the captured video data, passes between the second computer and the first computer, wherein the first computer has no knowledge that the second computer is capturing live video data of the first display screen;
  executing, with the second computer, a display recognition and characterization algorithm to recognize the unclassified data based only on user-recognizable objects in the unclassified data visible in the video data without the use of fiducial markers, bar codes, quick reaction codes, or nonvisible metadata whose only purpose is to provide augmentation location information; and
  augmenting the unclassified data by displaying classified data on the wearable, heads-up display viewable only to a second user, wherein the unclassified and classified data are both within the second user's field of view when the second user views the first display screen through the head-up display, and wherein the classified data is related to the unclassified data.

* * * * *